C. R. BLACKMAN.
HEADLIGHT.
APPLICATION FILED DEC. 4, 1909.
959,700.
Patented May 31, 1910.
2 SHEETS—SHEET 1.
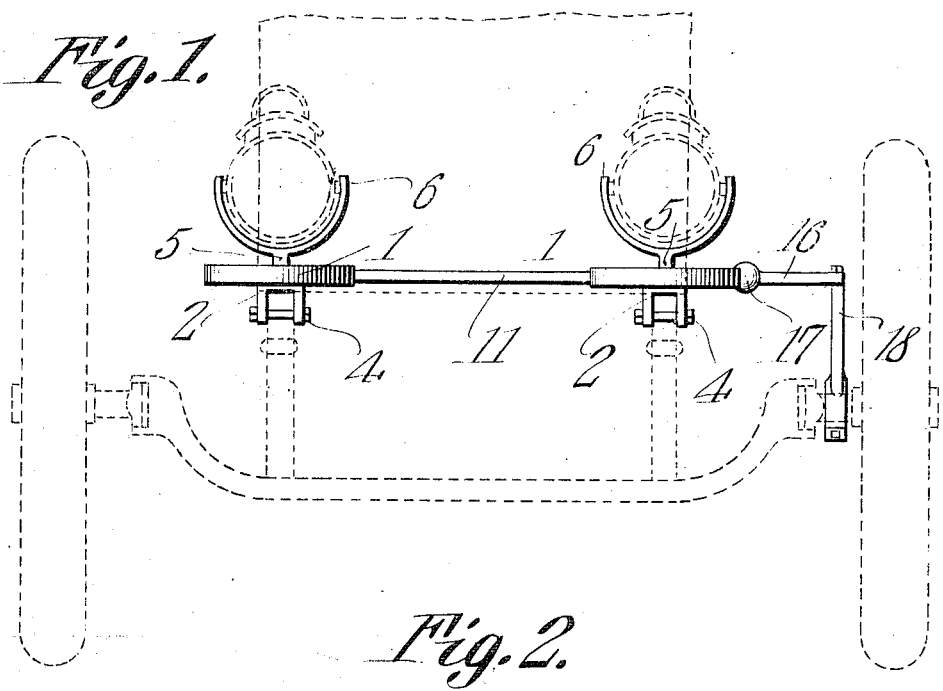
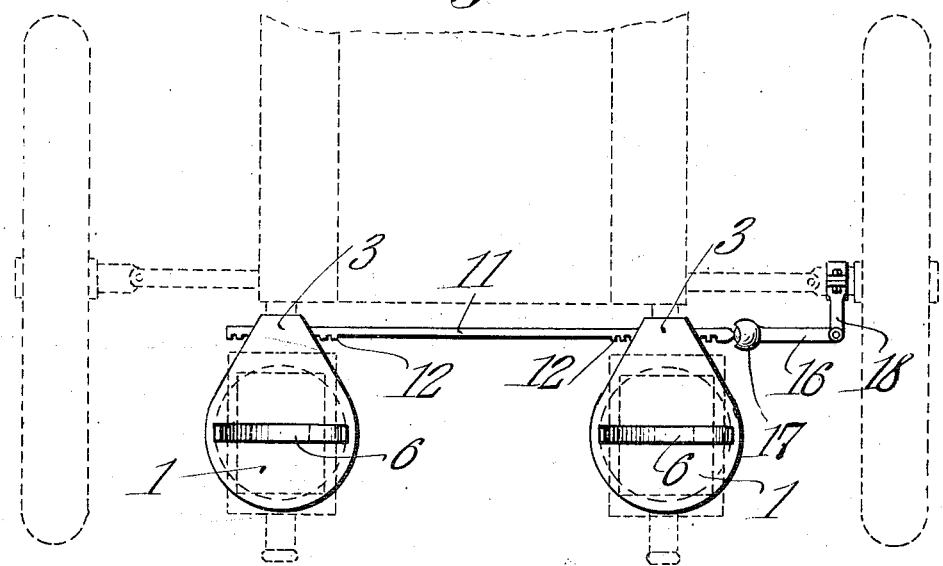
Witnesses
B. E. Head.
Mason B. Lawton
Inventor
Carl R. Blackman,
By C. A. Snow & Co.
Attorneys C. R. BLACKMAN.
HEADLIGHT.
APPLICATION FILED DEC. 4, 1909.
959,700.
Patented May 31, 1910.
2 SHEETS—SHEET 2.
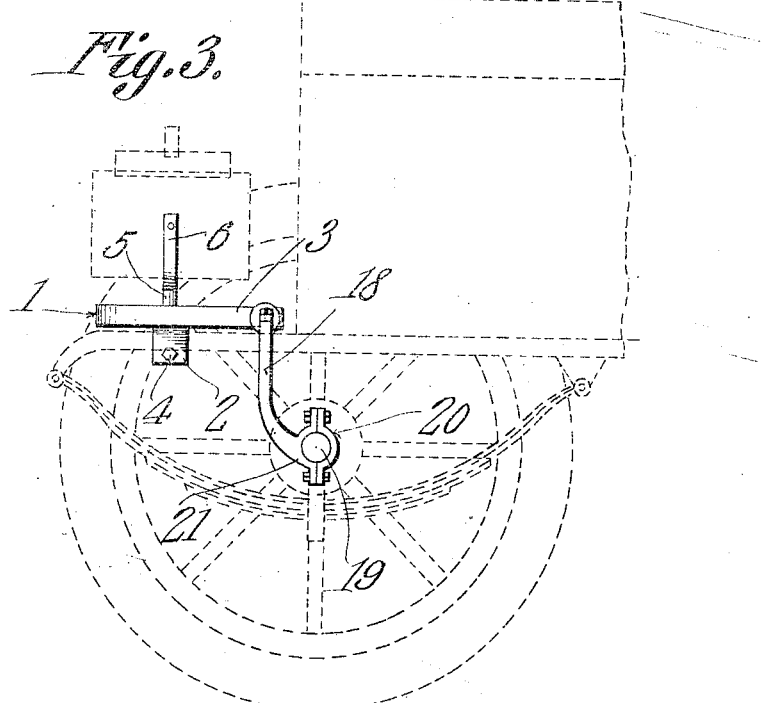
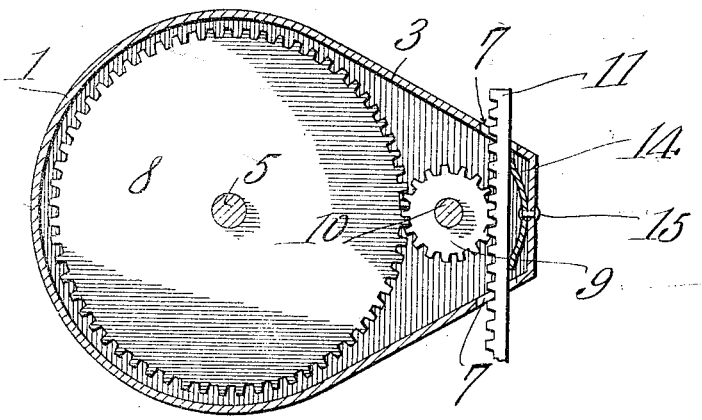
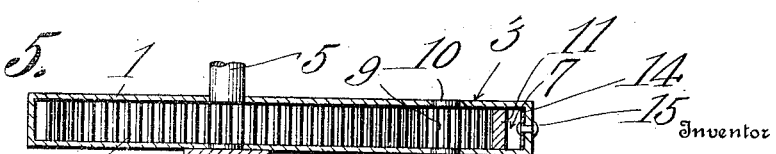
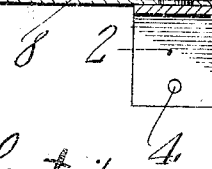
Witnesses
B. F. Stead
Mason B. Lawton
Inventor
Carl R. Blackman,
By C. A. Snow & Co.
Attorneys

UNITED STATES PATENT OFFICE.

CARL R. BLACKMAN, OF COLORADO SPRINGS, COLORADO.

HEADLIGHT.

959,700.　　　　Specification of Letters Patent.　　Patented May 31, 1910.

Application filed December 4, 1909. Serial No. 531,375.

*To all whom it may concern:*

Be it known that I, CARL R. BLACKMAN, a citizen of the United States, residing at Colorado Springs, in the county of El Paso and State of Colorado, have invented a new and useful Headlight, of which the following is a specification.

It is the object of this invention to provide a device of the class above mentioned so constructed that it may serve as a pivotal mounting for a pair of headlights of the type commonly used upon vehicles, means being provided whereby a lamp may operatively be connected with the movable portion of the axle of the vehicle, so that, as the said portion of the vehicle axle moves pivotally, to enable the vehicle to round a corner, the lamp may be turned accordingly, to follow the curve which the vehicle is taking.

The drawings show but one form of the invention and it is to be understood that changes, properly falling within the scope of what is claimed, may be made, without departing from the spirit of the invention.

Similar numerals of reference are employed to denote corresponding parts throughout the several figures of the drawings, wherein:—

Figure 1 is a front elevation; Fig. 2 is a top plan; Fig. 3 is a side elevation; Fig. 4 is a top plan of the case and of the mechanism contained therein, parts being broken away better to illustrate the structure; and Fig. 5 is a longitudinal section of the case, parts being shown in elevation.

The invention includes a pair of cases 1, adapted to be mounted upon the front of a vehicle. These cases 1 and the mechanism which is assembled therewith, are identical in construction, and a description of one of them will suffice for both.

The case 1 is provided upon its lower face, with a pair of depending arms 2 adapted to extend upon either side of the springs of the vehicle, a retaining member 4 being passed transversely through the arms 2 to secure the case to the springs. It is of course to be understood that any other desired means for mounting the case in place may be provided, in order that the case may be mounted otherwise than upon the springs of the vehicle. The forward end of the case 1 is approximately circular in contour, as shown most clearly in Fig. 4 of the drawings, the rear end of the case 1 being reduced in breadth, and brought to a blunt point, as denoted by the numeral 3. The case 1 is closed upon all sides, saving for openings 7 in the side walls thereof, adjacent the rear end of the case. Journaled for rotation in the case 1 is an upright shaft 5, extended above the top of the case, and provided with bifurcations 6 in which the lamp may be mounted in the usual manner.

Secured to the shaft 5 within the case 1, is a pinion 8, to the rear of which, and intermeshing therewith, is a smaller pinion 9, carried by a shaft 10 which is terminally mounted in the top and in the bottom of the case 1.

A bar 11 is provided, having, adjacent its ends, racks 12. This bar 11 is adapted to be inserted in the openings 7 in the case 1, the racks 12 engaging the pinions 9 which are mounted within the cases. Secured to the rear walls of the cases 1, by means of bolts 15 or the like, are leaf springs 14, arcuate in form, the extremities of which are adapted to bear against the bar 11, to hold the racks 12 in mesh with the pinions 9.

An arm 18 is provided, adapted to be assembled with the movable section 19 of the axle of the vehicle. In the present instance, the lower extremity of this arm 18 is bifurcated as denoted by the numeral 21, to embrace a portion of the axle 19, and to the ends of the bifurcation 21 is secured by bolts, or otherwise, a cap 20, whereby the arm 18 may be secured upon the portion 19 of the axle. This arm 18 extends forwardly of the section 19 of the axle, and rises above the same, the upper extremity of the arm 18 being pivotally connected with a bar 16, at one end, the other extremity of the bar 16 being united by a ball and socket joint 17, with one end of the rack bar 11, the bar 16 being disposed in a common plane with the rack bar.

By fashioning the arm 18 as shown, the lamps which are assembled with the shafts 5 may be located at any desired distance in front of the axle of the vehicle, the forward curvature of the arm 18 permitting the said arm to be mounted relatively near to the inner end of the movable section 19 and away from the moving wheel, the upper end of the arm 18, nevertheless, moving in an arc of sufficiently large radius, properly to operate the rack bar 11.

When the vehicle is moving upon level ground, as is ordinarily the case, owing to the fact that the rack bar 11 is maintained in a horizontal position by means of the cases 1, and owing to the fact that the bar 16 is pivotally connected with the rack bar 11 and with the arm 18, the rack bar 11 will have a smooth, even movement in the direction of its length only, any tilting in the rack bar being obviated by the particular manner in which the same is mounted in the cases 1. Should however, the relative vertical relations between the movable portion 19 of the axle and the cases 1 suddenly change, the ball and socket joint 17 will fully compensate for such change.

Having thus described the invention what is claimed is:—

1. A device of the class described including a case arranged to be mounted upon a vehicle; a lamp-carrying shaft journaled for rotation in the case; a pinion secured to the shaft within the case; a second pinion mounted in the case and in mesh with the other pinion; a rack bar slidably mounted in the case and in mesh with the second pinion; an arm arranged at its lower end for connection with the movable portion of a vehicle axle, and arranged to extend to the front of the axle and above the same; and a rigid connecting bar located in the plane of the rack bar and pivotally connected at one end to the upper end of the arm and pivotally connected at the other end to the rack bar.

2. A device of the class described including a case arranged to be mounted upon a vehicle; a lamp-carrying shaft journaled for rotation in the case; a pinion secured to the shaft within the case; a second pinion mounted in the case and in mesh with the other pinion; a rack bar slidably mounted in the case and in mesh with the second pinion; an arm arranged at its lower end for connection with the movable portion of a vehicle axle, and arranged to extend to the front of the axle and above the same; a rigid connecting bar located in the plane of the rack bar and pivotally connected at one end to the upper end of the arm; a ball and socket joint uniting the other end of the connecting bar with the rack bar; and a spring located within the case and bearing against the rack bar to hold the same in mesh with the second pinion.

3. A device of the class described comprising spaced cases adapted to be mounted upon a vehicle; lamp-carrying shafts journaled for rotation in the cases; a bar held by the cases for sliding movement in the direction of its length; means located within the cases for operatively connecting the bar with the shafts to secure a rotation of the latter upon a reciprocation of the former; and axle-carried means for sliding the bar.

4. A device of the class described comprising spaced cases adapted to be mounted upon a vehicle; lamp carrying shafts journaled for rotation in the cases; a bar held by the cases for sliding movement in the direction of its length, and provided with racks; gear trains for the operation of the shafts located in the cases and engaging the racks; resilient, case-carried means for maintaining the racks in engagement with the gear trains; and axle-carried means for moving the bar.

5. A device of the class described comprising spaced cases adapted to be mounted upon a vehicle; lamp-carrying shafts journaled for rotation in the cases; a bar held by the cases for longitudinal sliding movement, and provided with racks; gear trains for the operation of the shafts located in the cases and engaging the racks; axle-carried means for moving the bar; and a swivel connection between said means and the bar.

In testimony that I claim the foregoing as my own, I have hereto affixed my signature in the presence of two witnesses.

CARL R. BLACKMAN.

Witnesses:
LAWRENCE K. LUNT,
RAYNER M. GARDINER.